UNITED STATES PATENT OFFICE.

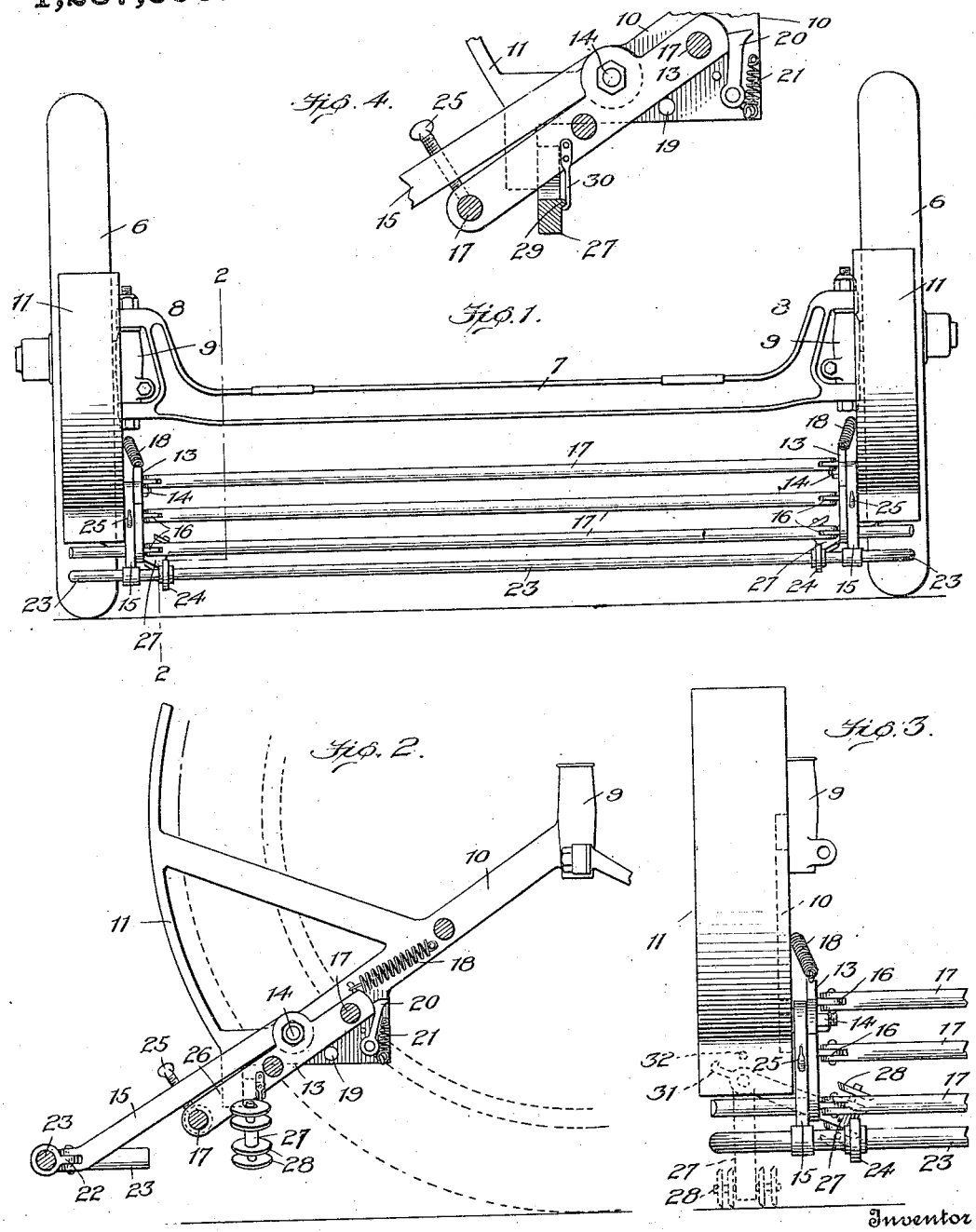

SAMUEL THOMAS WALKUP, OF NEW YORK, N. Y.

WHEEL-GUARD FOR AUTOMOBILES.

1,237,590. Specification of Letters Patent. Patented Aug. 21, 1917.

Application filed September 1, 1916. Serial No. 118,007.

*To all whom it may concern:*

Be it known that I, SAMUEL T. WALKUP, a citizen of the United States, and resident of New York, in the county of New York and State of New York, have invented certain new and useful Improvements in Wheel-Guards for Automobiles, of which the following is a specification, reference being had therein to the accompanying drawing.

This invention relates to wheel guards or fenders for automobiles and its general objects are to provide guards which will maintain proper position when the wheels turn to right or left, which will swing downward when it meets resistance, and that will guard each wheel and also the intervening space.

In the accompanying drawings,

Figure 1 is a front elevation of the forward axle and wheels of an automobile provided with my devices.

Fig. 2 is a section on the line 2—2, Fig. 1, looking to the left and the wheels being omitted.

Fig. 3 is a partial enlarged front view showing devices seen in Fig. 1, but with an ice cutter added.

Fig. 4 is an enlarged sectional elevation of devices seen in part in Fig. 2.

Fig. 5 is a detail view showing one element of the structure detached.

In these figures, 6—6, represent the wheels, 7 indicates the axle and 8 the ordinary joints or knuckles having member 9 which allow the wheels and stub axles to swing with respect to the main axle. To each member 9 is integrally or otherwise rigidly attached an arm 10 bearing a curved wheel fender 11 at some distance from the ground, and connected to its companion arm by a jointed tie rod 12. Upon the inner side of each arm 10 is a bar 13 centrally pivoted at 14, and on the same axis is pivoted a forwardly projecting arm 15, both bar and arm swinging in vertical planes. Each bar 13 is provided on its inner side with flat horizontal tongues 16 which enter and are pivoted in the slotted ends of guard bars 17 extending from one bar 13 to its companion, and each bar 13 further bears, on its outer side, a bar in position to guard the wheel below the fender 11.

The bar 13 is normally held in the position of Fig. 2 by a spring 18 which swings it against a stop 19; but rearward or downward pressure applied to the lower end of the bar rotates the latter on its pivot and raises its upper end above a pawl 20 which is immediately swung beneath the bar and against a suitable stop by a spring 21. The pawl thus holds the bar in its depressed position until the pawl is manually retracted.

The arm 15 extends to a point at some distance forward of and below the lower rod 17 and is slotted at its lower end to receive and pivotally hold a horizontal tongue 22 projecting rearward from a guard bar 23 which connects the two bars 15, has its end portions curved around the front of the tire, and is provided with rollers 24 to rest upon the ground and thus limit the downward movement of this bar. The normal height of the bar may be adjusted by set screws 25, engaging, respectively with projections on the bars 13.

Upon a projection 26 on the arm 10, an arm 27 is pivoted to swing transversely and is provided with a rotary, preferably serrated ice cutting wheel or wheels, 28, at its lower end, and with a lip 29 Fig. 4, which, when the arm is swung upward, is engaged by a spring hook 30 on the bar 13, whereby the arm 27 is normally held far above the roadway. When the device is released by the spring hook, gravity swings it to vertical position, an arm 31 meeting a stop 32 and limiting the movement.

If the lower bar 17 or the bar 23 strike any resisting object, the arms 15 and bars 13 will be swung downward to a distance ordinarily limited by the wheels 24 and locked by the pawl 20. If the pawl be manually swung to its position in Fig. 2, the spring 18 restores the bar 13 and arm 15 to initial position.

It is to be observed that the arm 10 and fender 11 are rigidly connected with the stub axle on which the wheel rotates and hence that they turn with the wheel when it swings to right or left, the wheel having no independent movement other than its rotation on its axis. Obviously the joints permit the bars to adjust themselves to lateral movements of the fenders and permit the entire guard structure to shift with respect to the main axle so that said guard structure does not project materially beyond the wheels and therefore always guards the wheels and the intervening space.

What I claim is:

1. The combination with a main axle and stub axles hinged to its ends, respectively, of distinct fender structures for the fronts of the wheels, respectively, and an intermediate fender supported by and spanning the space between the two structures and having with both hinge connections allowing relative movement about approximately vertical axes, said structures being supported from and swinging with the corresponding stub axles.

2. A fender structure for each wheel of an automobile arranged to swing to right or left with the corresponding wheel, combined with guard bars extending from one structure to the other and hinged to each, certain of said bars being arranged to swing downward on meeting an obstruction.

3. The combination with fender bars normally carried above the ground and extending across the front of an automobile, of means whereby resistance to the advance of certain of said bars causes the foremost bars to swing toward the ground, and automatic means for locking the bars against return to normal positions.

4. The combination with a main axle having at its ends hinged stub axles, of wheels mounted upon the stub axles, respectively, a fender structure in front of each wheel and rigidly connected to the corresponding stub axle to turn to right and left therewith, and a series of bars hinged to each fender structure and spanning the space between the two.

5. The combination with a main axle having wheel bearing stub axles at its ends, of arms rigidly connected with the stub axles, respectively, extending alongside the plane of the corresponding wheel and each provided with a rigidly connected fender, inclined bars pivoted to the arms, respectively, to swing in vertical planes a series of rods hinged to each bar to swing on approximately vertical axes, means whereby resistance to the advance of the foremost rod causes the bars and rods to swing upon said axes, and means for preventing return movement.

6. The combination with fender structures mounted in front of automobile wheels to swing to right and left therewith, of a series of guard rods connecting said structures and hinged to both, a similarly hinged, independently mounted guard rod in front of the rods first mentioned, means for adjusting the normal distance of the foremost rod from the ground, and means whereby resistance to the advance of the foremost rod may release it and allow it to swing downward.

In testimony whereof I hereunto affix my signature.

SAMUEL THOMAS WALKUP.

Copies of this patent may be obtained for five cents each, by addressing the "Commissioner of Patents, Washington, D. C."